(12) United States Patent
Aytur et al.

(10) Patent No.: US 7,865,642 B2
(45) Date of Patent: Jan. 4, 2011

(54) PRE-ASSOCIATION FOR CWUSB

(75) Inventors: Turgut Aytur, Irvine, CA (US); Fred Battaglia, Irvine, CA (US); Saurabh Garg, Irvine, CA (US); Batuhan Okur, Irvine, CA (US); Ping-Wen Ong, Irvine, CA (US); Venkatesh Rajendran, Irvine, CA (US); Ran-Hong Yan, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 225 days.

(21) Appl. No.: 12/272,287

(22) Filed: Nov. 17, 2008

(65) Prior Publication Data
US 2009/0132738 A1 May 21, 2009

Related U.S. Application Data

(60) Provisional application No. 60/988,747, filed on Nov. 16, 2007.

(51) Int. Cl.
G06F 13/42 (2006.01)
G06F 13/00 (2006.01)
(52) U.S. Cl. .......................... 710/105; 710/62; 710/11; 710/315
(58) Field of Classification Search ......... 710/105–106, 710/62–24, 10–11, 313–315
See application file for complete search history.

(56) References Cited

U.S. PATENT DOCUMENTS 7,685,322 B2 * 3/2010 Bhesania et al. ............... 710/8
7,725,613 B2 * 5/2010 Bhardwaj et al. ............... 710/8
2007/0067628 A1 * 3/2007 Kim et al. .................... 713/168
2007/0204069 A1 * 8/2007 Bhesania et al. ............... 710/8
2008/0003556 A1 * 1/2008 Takahashi et al. ........ 434/307 R
2008/0162742 A1 * 7/2008 Kong et al. .................... 710/19
2008/0222315 A1 * 9/2008 Maszak et al. ................ 710/14
2009/0119427 A1 * 5/2009 Takahashi .................... 710/106
2009/0125653 A1 * 5/2009 Aytur et al. .................... 710/72
2010/0064090 A1 * 3/2010 Learmonth et al. .......... 710/316

OTHER PUBLICATIONS

Wireless Universal Serial Bus Specifications, Agere, HP, Intel, Microsoft. NEC, Phillips, Samsung, May 12, 2005, Revision 1.0.

(Continued)

Primary Examiner—Christopher B Shin
(74) Attorney, Agent, or Firm—Thomas, Kayden, Horstemeyer & Risley, LLP

(57) ABSTRACT

Certified Wireless USB 1.0 defines two different types of association: cable association and numeric association. In order to implementation these two association methods, the CWUSB device needs to have either upstream USB connector (for cable association) or display capability (for numeric association). These extra requirements make the CWUSB device bulkier (one more USB connector) and/or more expensive (extra display components). For cheap and simple CWUSB devices, we need a simpler association method that is easy and cheap to implement. In a pre-packaged total solution, which includes a host and one or more device(s), we can use pre-association to smooth the user experience. The host and device(s) are pre-associated. When an end user starts to use this solution, they do not need to worry about the association at all.

27 Claims, 3 Drawing Sheets

OTHER PUBLICATIONS

Association Models Supplement to the Certified Wireless Universal Serial Bus Specification, Mar. 2, 2006, revision 1.0.

U.S. Appl. No. 12/269,594 Turgut Aytur, Fred Battaglia, Ravishankar H. Mahadevappa, Saurabh Garg, Batuhan Okur, Ping-Wen Ong, and Venkatesh Rajendran.

U.S. Appl. No. 12/269,643 Turgut Aytur, Fred Battaglia, Ravishankar H. Mahadevappa, Saurabh Garg, Batuhan Okur, Ping-Wen Ong, and Venkatesh Rajendran.

\* cited by examiner

PRE-ASSOCIATION FOR CWUSB

CROSS-REFERENCE TO RELATED APPLICATION(S)

This application claims the benefit of the filing date of U.S. Provisional Patent Application No. 60/988,747, filed Nov. 16, 2007, the disclosure of which is incorporated by reference within.

BACKGROUND OF THE INVENTION

Certified Wireless USB 1.0 defines two different types of association: cable association and numeric association. In order to implementation these two association methods, the CWUSB device needs to have either upstream USB connector (for cable association) or display capability (for numeric association). These extra requirements make the CWUSB device bulkier (one more USB connector) and/or more expensive (extra display components). For cheap and simple CWUSB devices, we need a simpler association method that is easy and cheap to implement.

BRIEF SUMMARY OF THE INVENTION

In a pre-packaged total solution, which includes a host and one or more device(s), we can use pre-association to smooth the user experience. The host and device(s) are pre-associated. When an end user starts to use this solution, device(s) and host will be connected automatically without going through any extra step to associate them together.

A Connection Context defined in CWUSB consists of three 16-bytes values: Connection Host ID (CHID), Connection Device ID (CDID) and Connection Key (CK). The purpose of association process is to share the same connection context between the host and the device. The CK is the shared secret, which is one major component to derive the other keys used in the secure communication between host and device.

BRIEF DESCRIPTION OF THE DRAWINGS

Please note that the drawings shown in this specification may not be drawn to scale and the relative dimensions of various elements in the diagrams are depicted schematically and not to scale.

DETAILED DESCRIPTION OF THE INVENTION

Since the key-derivation process in the 4-way handshake procedure used in the CWUSB environments uses CHID, CDID and CK, both the host and device need to have the same Connection Context. One big problem in the pre-association is that there is no way to know what CHID the host will use since it is the driver's job to manage the CHID life cycle. Therefore, only the CDID and CK can be pre-created and saved in both host (HWA dongle or WHCI express card, etc.) and device hardware. To solve the unknown CHID problem, we purpose three different solutions:

Algorithm approach: Use a 'known' algorithm to derive the CHID from some of the 'known' properties from the CWUSB host;

Multi-CHID approach: Host broadcasts more than one CHID in the MMC (Micro-scheduled Management Command) packet; and Fixed-CDID-CK approach: Device tries to connect using pre-associated CDID and CK if the CHID is not in its local database.

All approaches are backward compatible with the current CWUSB standard but require modification in the host driver.

Implementation

All approaches require the pre-association data stored in the CWUSB host hardware accessible from the CWUSB host driver (HWA driver, WHCI driver, etc). For HWA, driver could access them by using vendor-specific requests. For WHCI, driver could access them by register or direct access to the PCI(e)'s device memory. After extraction of these components of pre-association information, the driver needs to update the local CCDB (Connection Context Data Base) to reflect the newly acquired entries with a special flag that indicates these entries are pre-associated.

Algorithm Approach

The key concepts for the algorithm approach are:

1. The use of the virtual CHID in the host driver and the device firmware to perform the normal connection procedure.

2. Host information, a known hash function located in the host driver and the device firmware are used to create the virtual CHID. The host information includes the EUI-48 (6 byte), MAC-address (2 byte), Channel (1 byte) and Band Group (1 byte) components. The algorithm could use one or any combination of these components as long as they are equivalent on both the host and device side. The hashing function can be any function as long as it is shared by host and device and is not a really bad degenerating function. One simple combination is to use the EUI-48 directly as the CHID.

Figure 1:
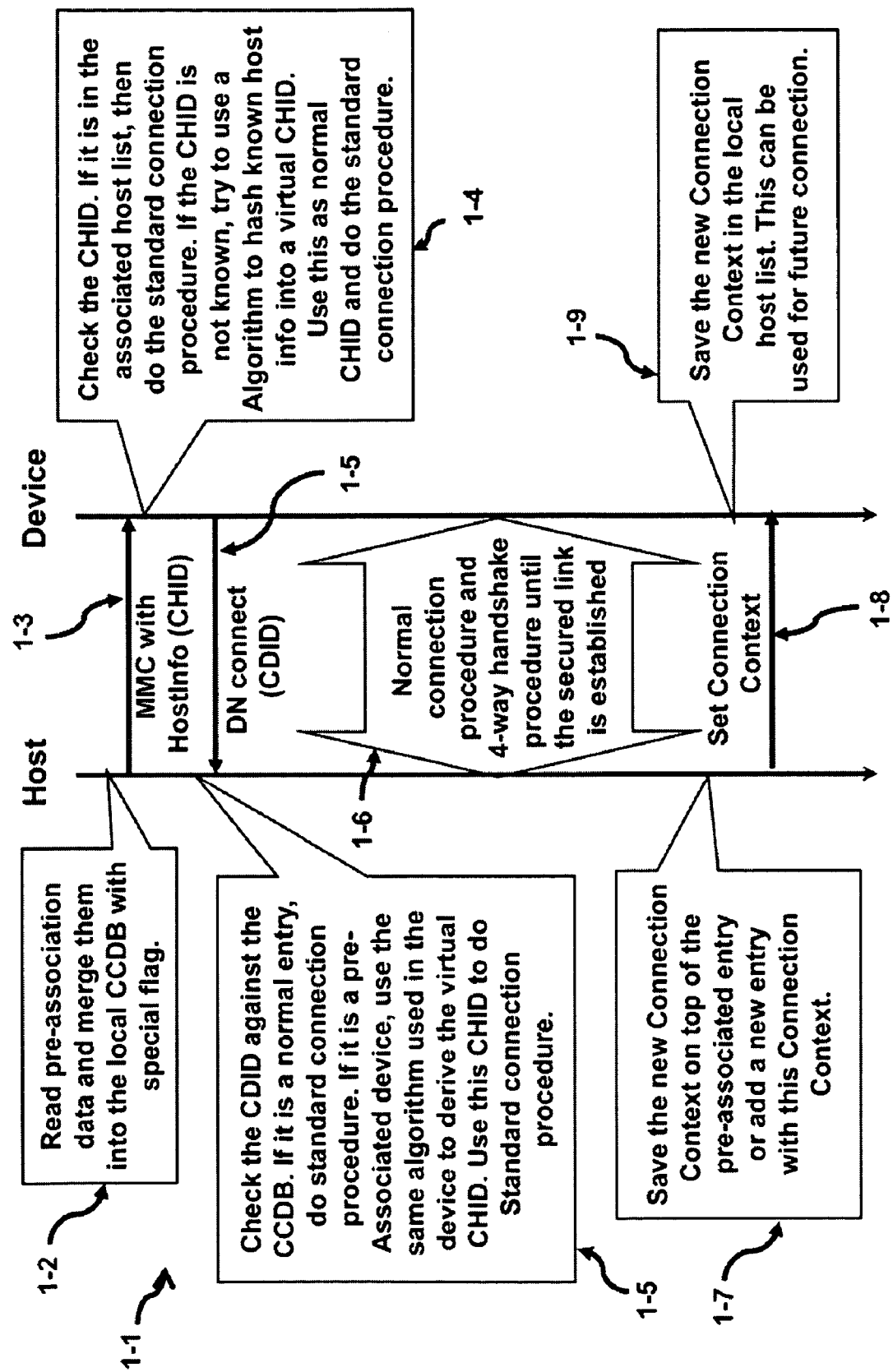
FIG. 1 depicts a 4-way handshake using an Algorithm Approach to determine the connection procedure in accordance with the present invention.

FIG. 1 illustrates a 4 way handshake procedure 1-1. At the host, the block 1-2 reads the pre-association data and merges them into the local CCDB with a special flag indicating these are pre-associated devices. The setting of the flag within the host indicates that host has pre-association data embedded into it at the factory. An MMC (Micro-scheduled Management Command) sends scheduling information to the devices where this information is transferred using TDM (Time Division Multiplexing) scheduling. In addition, the CHID is sent 1-3 with the MMC to the device.

At the device, the block 1-4 checks to see if CHID is in the association list; if so then do the standard procedure to the host. However, if the CHID is unknown (not in the association list), use an algorithm to hash the host information into a virtual CHID. The host information, as mentioned previously, includes the EUI-48 (6 byte), MAC-address (2 byte), Channel (1 byte) and Band Group (1 byte) components. The device receives the host information by the WiMedia beaconing protocol and WUSB protocol. The device uses the virtual CHID to perform the normal standard connection procedure to the host during the establishment of the secure link.

During the transfer 1-5, Device Notification (DN) carries information indicating the device wants to establish a connection. In addition, the CDID is also sent to the host. The host checks the CDID against its CCDB. If it is a normal entry, do the standard connection procedure. Other wise, read the flag to see if the device has been pre-associated. If it is a pre-associated device, use the same algorithm that was used in the device to hash the host information into a virtual CHID. The host would use the same host information as what was used in the device. This virtual CHID will be used to do the standard connection procedure.

Note several similarities between the host and the device: both require the identical algorithm; and both have access to the same host information that serves as a seed in the hashing step. The host information originated within the host and was then sent to the device via the WiMedia beacon packets and regular WUSB packets. Thus, the host information within the host is identical to the host information held in the device. The virtual CHID that is generated from the seed (host information) being hashed by the algorithm is calculated on the host and similarly the virtual CHID is generated on the device. Thus, the device and host now share a common secret: the virtual CHID.

Now, perform a normal connection procedure along with the 4-way handshake procedure 1-6. Do this until the security of the link is established. Generate and save the new connection context on top of the pre-associated entry or add a new entry with the Connection Context 1-7. Then pass 1-8 the Connection Context to the device and save the Connection Context in the local host list. This information can be used for future connections.

Once the normal Connection Context is established on both sides, the host can ignore the pre-associated entry from now on. The device, however, should keep the pre-associated entry in its local database. This is due to the possibility of this pre-associated package being used on another computer which has different local CCDB. It also implies that the host hardware (HWA or WHCI express card, etc.) needs to keep the pre-association data too.

The pre-association information is saved in ROM or Flash memory on both the host and device side. So, if the HWA is connected to another computer that has different CCDB, the device is expected to work with this host where the host can be connected to any computer. This implies that the devices are actually pre-associated with the WUSB host hardware (HWA or WHCI), not the computer. So, both sides need to use the pre-association data to establish the connection if possible.

Multi-CHID Approach:

The key concept here is to include more than one HostInfo IE in the MMC to let device know that the host accepts a normal connection request and a pre-associated connection request. Once the secure connection is established, the host and the device will do the same thing as described in the "algorithm approach" section. In other words, the next step is to perform a normal connection procedure along with the 4-way handshake procedure 1-6 as illustrated in FIG. 1. Do this until the security of the link is established. Save the new connection context on top of the pre-associated entry or add a new entry with the Connection Context 1-7. Then pass the Connection Context to the device 1-8 and save the Connection Context in the local host list. This information can be used for future connections.

Figure 2:
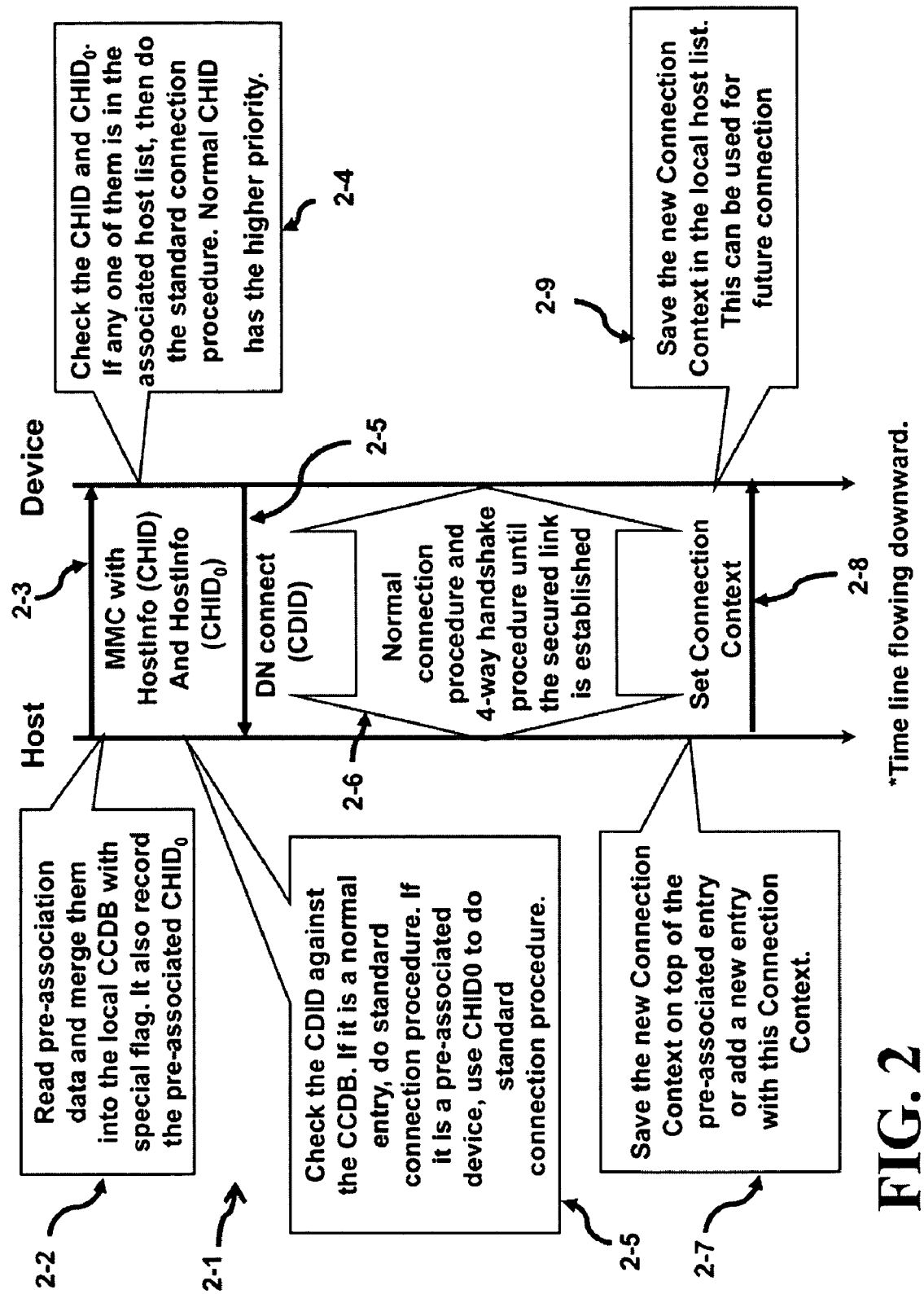
FIG. 2 depicts a 4-way handshake using a Multi-CHID Approach to determine the connection procedure in accordance with the present invention.

FIG. 2 illustrates a Multi-CHID 4 way handshake 2-1. At the host, the block 2-2 reads the pre-association data and merges them into the local CCDB with a special flag. It also records the pre-associated $CHID_0$. The $CHID_0$ was stored in the package before shipping the package out of the factory. MMCs with both CHID and $CHID_0$ are sent 2-3 to the device. At the device, the block 2-4 checks the CHID and $CHID_0$ to see if it is in the association list then do the standard procedure. In case of conflict, the normal CHID has the higher priority. During the transfer 2-5, Device Notification (DN) and CDID is also sent to the host. The host checks the CDID against the CCDB. If it is a normal entry, do the standard connection. Other wise, if it is a pre-associated device, use $CHID_0$ to do the standard connection procedure.

Now, perform a normal connection procedure along with the 4-way handshake procedure 2-6. Do this until the security of the link is established. Generate and save the new connection context on top of the pre-associated entry or add a new entry with the Connection Context 2-7. Then pass 2-8 the Connection Context to the device and save the Connection Context in the local host list of the device. This information can be used for future connections.

There are some drawbacks of this approach: It needs to include two HostInfo IE in the MMC which is not part of the CWUSB 1.0 spec (although it is backward compatible). In addition, the CHI Do is always fixed which could be a security hassle. Other than that, a Multi-CHID Approach is simpler than the Algorithm Approach.

Fixed-CDID-CK Approach

Figure 3:
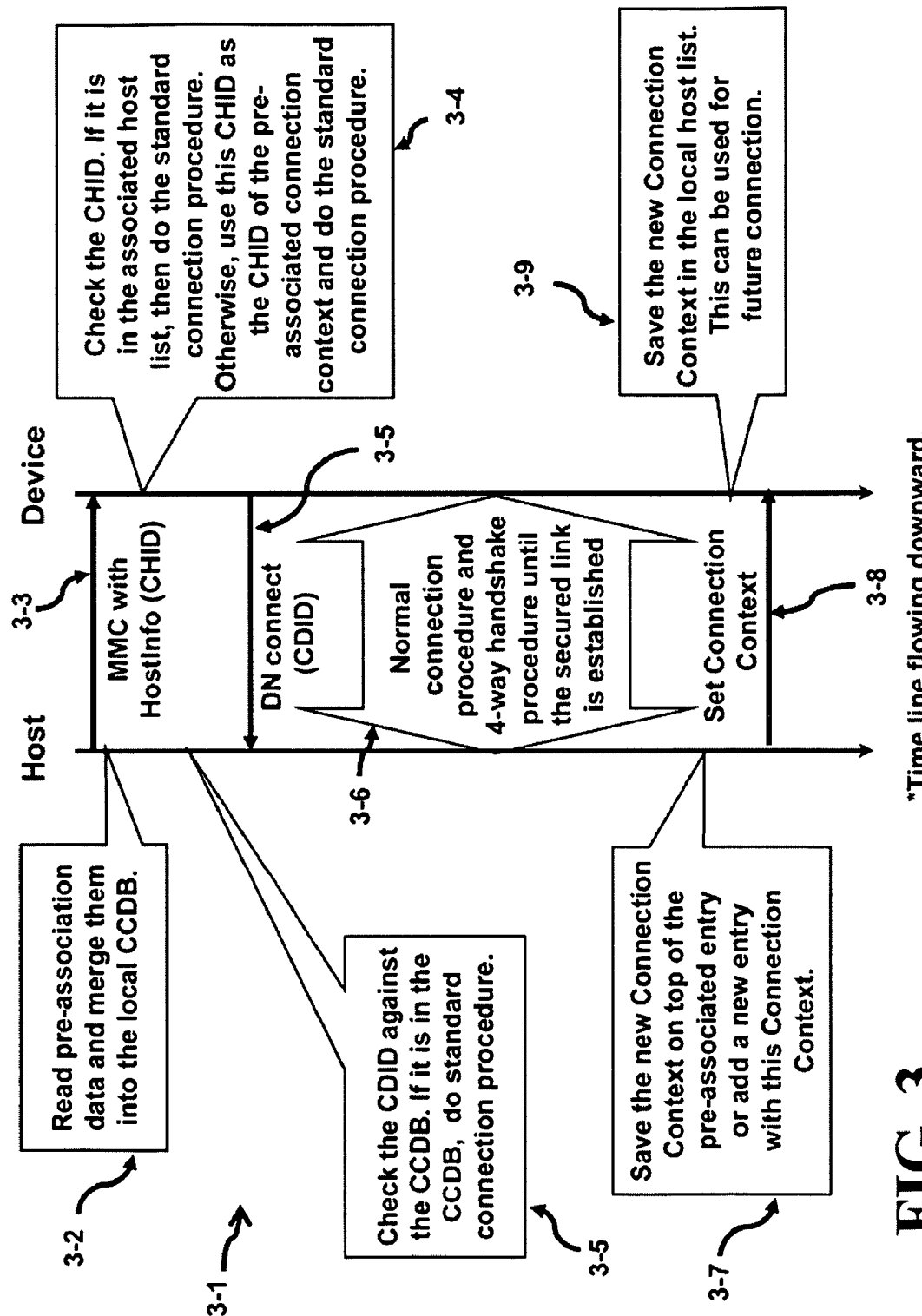
FIG. 3 depicts a 4-way handshake using a Fixed-CDID-CK Approach to determine the connection procedure in accordance with the present invention.

FIG. 3 illustrates a Fixed-CHID-CK 4 way handshake 3-1. At the host, the block 3-2 reads the pre-association data and merges them into the local CCDB. An MMC with CHID is 3-3 sent to the device. At the device, the block 34 checks the CHID to see if it is in the association list then do the standard procedure. Other wise, if it is not in the association list, the CHID should be used as the CHID of the pre-associated connection context and do the standard connection procedure. During the transfer 3-5, Device Notification (DN) and CDID are sent to the host. The host checks the CDID against the CCDB. If the CDID is in the CCDB, do the standard connection. If the CDID is not in the CCDB, then the host will abandon the connection attempt being made from the device since the CDID should be in the merged CCDB on the host for all the pre-associated devices.

Now, perform in a normal connection procedure along with the 4-way handshake procedure 3-6. Do this until the security of the link is established. Generate and save the new connection context on top of the pre-associated entry or add a new entry with the Connection Context 3-7. Then pass 3-8 the Connection Context to the device and save the Connection Context in the local host list. This information can be used for future connections.

Remark

All these pre-association methods have one common requirement: they all need to have different pre-associated Connection Context generated in the factory between different paired solutions. So no two packages of host plus devices will share any common Connection Contexts. Only then can we assume there is no way to access the pre-associated information without making direct physical contact with the host and the devices. Thus, the extraction of this pre-associated information, other than as it is used in this invention, would require an exorbitant amount of effort, for example; reverse engineering, careful probing, waveform analysis, etc. to undermine the secure connection.

Finally, it is understood that the above description are only illustrative of the principle of the current invention. It is understood that the various embodiments of the invention, although different, are not mutually exclusive. In accordance with these principles, those skilled in the art may devise numerous modifications without departing from the spirit and scope of the invention. For example, one can combine the Algorithm approach and the fixed-CDID-CK approach to use EUI-48 broadcast in the host beacon to identify this host is pre-associated host and just use the CHID in the regular 4-way handshake procedure. These concepts can be incorporated into other wireless systems using other standards or proprietary wireless interfaces. The invention can be practiced using many devices coupled to the host although the specification mainly described a host-device interface. The Connection Host ID (CHID) may be addressed as a host identifier while the Connection Device ID (CDID) may be addressed as a device identifier. The terms "standard connection procedure" and "normal connection procedure" can be considered interchangeable terms. In addition, a wireless channel can be formed by sending one or more different packet protocols in said wireless channel. Some examples of packet protocol includes: WiMedia beaconing packet protocol and CWUSB packet protocol.

What is claimed is:

1. An apparatus comprising:
a host seed located in a host;
a first wireless channel connecting said host to at least one of a plurality of devices;
said host seed is wirelessly transferred to all devices that are coupled to said first channel;
a second wireless channel connecting said host to all said devices;
a host identifier wirelessly transferred from said host to all devices coupled to said second channel;
a device identifier is wirelessly transferred on said second channel from one of said devices to said host;
a special flag indicating that said host can recognize a certain device identifier; and
a normal connection can be formed when said certain device identifier matches said device identifier.

2. The apparatus of claim 1, further comprising:
a plurality of different packet protocols forming said first wireless channel.

3. The apparatus of claim 1, further comprising:
one or more different packet protocols forming said second wireless channel.

4. The apparatus of claim 1, further comprising:
a computer coupled to said host.

5. The apparatus of claim 4, further comprising:
a device algorithm that hashes said host seed into a secret device key; and
a host algorithm that hashes said host seed into a secret host key.

6. The apparatus of claim 5, wherein
said device algorithm is identical to said host algorithm causing said secret device key to be identical to said secret host key.

7. The apparatus of claim 6 further comprising:
a normal connection procedure established by using a handshake procedure based on said secret device key and secret host key being identical.

8. The apparatus of claim 7, wherein
said handshake procedure uses a 4-way handshake to establish a secure link.

9. The apparatus of claim 7, wherein
said first wireless channel uses WiMedia beaconing packet protocol and CWUSB packet protocol to send said host seed.

10. The apparatus of claim 9, wherein
said second wireless channel uses WiMedia beaconing packet protocol or CWUSB packet protocol to send said host and device identifiers.

11. The apparatus of claim 1, wherein
said host seed is also known as host information;
said device identifier is also known as a CDID; and
said host identifier is also known as a CHID; wherein said CDID and said CHID form part of a connection context.

12. The apparatus of claim 11, further comprising:
a new host CK set equal to said secret host key;
a new device CK set equal to said secret device key;
a host database storing said new host CK, CHID and CDID as a new host connection context; and
a device database storing said new device CK, CHID and CDID as a new device connection context;
whereby a future connection can be established by searching database for said new connection contexts.

13. An apparatus comprising:
a computer coupled to a host;
one or more host identifiers stored in said host;
a wireless channel connecting said host to a plurality of devices;
a device identifier is wirelessly transferred on said channel from one of said devices to said host;
one or more host identifiers transferred from said host to all devices wirelessly coupled to said channel;
a local host list on said device searched for said one or more host identifiers for a match; and
if said match occurs then perform a standard connection procedure using matched host identifier, else perform said standard connection procedure using either of said host identifiers; whereby said wireless channel uses one or more different packet protocols to send said host and device identifiers.

14. The apparatus of claim 13, wherein
at least one of said packet protocols uses CWUSB packets in said wireless channel.

15. The apparatus of claim 13, further comprising:
a special flag indicating said host can recognize a certain device identifier; and
a normal connection can be formed when said certain device identifier matches said device identifier.

16. The apparatus of claim 13, wherein
said device identifier is also known as a CDID; and
said host identifier is also known as a CHID; wherein said CDID and said CHID form part of a connection context.

17. The apparatus of claim 16, wherein
said standard connection procedure uses a 4-way handshake to establish a secure link.

18. The apparatus of claim 17, further comprising:
a host database storing CK and said CHID and CDID as a new host connection context; and
a device database storing CK and said CHID and CDID as a new device connection context; whereby a future connection can be established by searching database for said new connection contexts.

19. The apparatus of claim 13, further comprising:
said wireless channel uses WiMedia beaconing packet protocol and CWUSB packet protocol to at least one of said devices.

20. The apparatus of claim 19, wherein
said device identifier is also known as a CDID; and
said host identifier is also known as a CHID; wherein said CDID and said CHID form part of a connection context.

21. The apparatus of claim 20, wherein
said standard connection procedure uses a 4-way handshake to establish a secure link.

22. The apparatus of claim 21, further comprising:
a host database storing CK and said CHID and said CDID as a new host connection context; and
a device database storing CK and said CHID and said CDID as a new device connection context;
whereby a future connection can be established by searching database for said new connection contexts.

23. A method of forming a normal connection when a certain device identifier matches a device identifier comprising the steps of:
- coupling a host to a first device of a plurality of devices using a first wireless channel;
- copying a host seed located in said host to said first device using said first channel;
- coupling said host to said first device using a second wireless channel;
- copying a host identifier located in said host to said first device using said second channel;
- copying said device identifier located in said first device to said host using said second channel;
- hashing said host seed located in said first device using an algorithm to generate a secret key;
- hashing said host seed located in said host using said algorithm to generate said secret key;
- setting a special flag indicating that said host can recognize said certain device identifier; and
- forming said normal connection when said certain device identifier matches said device identifier.

24. The method of claim 23, further comprising the steps of:
- coupling a computer to said host.

25. The method of claim 24, further comprising the steps of:
- hashing a device algorithm with said host seed into a secret device key; and
- hashing a host algorithm with said host seed into a secret host key.

26. The method of claim 25, wherein
said device algorithm is identical to said host algorithm causing said secret device key to be identical to said secret host key.

27. The method of claim 26 further comprising the steps of:
- establishing a normal connection procedure by using a handshake procedure based on said secret device key and secret host key being identical.

* * * * *